United States Patent
Roddy et al.

(10) Patent No.: US 7,301,497 B2
(45) Date of Patent: Nov. 27, 2007

(54) STEREO DISPLAY FOR POSITION SENSING SYSTEMS

(75) Inventors: James E. Roddy, Rochester, NY (US); William M. Barnick, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 199 days.

(21) Appl. No.: 11/099,348

(22) Filed: Apr. 5, 2005

(65) Prior Publication Data

US 2006/0220953 A1    Oct. 5, 2006

(51) Int. Cl.
*G01S 13/00* (2006.01)

(52) U.S. Cl. .......................... 342/176; 342/38; 342/78

(58) Field of Classification Search ........... 342/357.11, 342/78, 38, 117, 443, 425, 357.01, 52, 70, 342/54, 154, 30, 140, 185, 186, 179–183, 342/29, 32, 33, 36, 37; 348/148, 143; 382/151, 382/216, 291

See application file for complete search history.

(56) References Cited

U.S. PATENT DOCUMENTS

| | | | | |
|---|---|---|---|---|
| 2,434,897 A | * | 1/1948 | Ayres ........................ | 342/180 |
| 2,949,055 A | * | 8/1960 | Blackstone ................. | 348/52 |
| 3,025,514 A | * | 3/1962 | Alexander et al. .......... | 342/29 |
| 3,044,058 A | * | 7/1962 | Harris ........................ | 342/180 |
| 3,072,902 A | * | 1/1963 | Bernstein et al. ........... | 342/123 |
| 3,200,398 A | * | 8/1965 | Witt ........................... | 342/180 |
| 3,213,757 A | * | 10/1965 | Cardwell, Jr. ............... | 409/84 |
| 3,555,505 A | * | 1/1971 | Srogi ......................... | 340/990 |
| 3,636,330 A | * | 1/1972 | Holeman et al. ........... | 701/222 |
| 3,737,902 A | * | 6/1973 | O'Hagan et al. ............ | 342/41 |
| 4,027,307 A | * | 5/1977 | Litchford .................... | 342/32 |
| 4,158,841 A | * | 6/1979 | Wuchner et al. ............. | 342/71 |
| 4,602,336 A | * | 7/1986 | Brown ....................... | 701/223 |
| 4,805,015 A | | 2/1989 | Copeland | |
| 4,872,051 A | * | 10/1989 | Dye ........................... | 348/113 |
| 4,940,987 A | * | 7/1990 | Frederick .................. | 342/26 D |
| 5,128,874 A | * | 7/1992 | Bhanu et al. ............... | 701/301 |
| 5,198,819 A | * | 3/1993 | Susnjara .................... | 342/26 B |
| 5,202,690 A | * | 4/1993 | Frederick .................. | 342/26 B |
| 5,402,129 A | * | 3/1995 | Gellner et al. ............... | 342/70 |
| 5,619,264 A | * | 4/1997 | Yoshimura et al. ......... | 348/352 |
| 5,647,016 A | * | 7/1997 | Takeyama ................... | 382/103 |
| 5,659,318 A | * | 8/1997 | Madsen et al. ........... | 342/25 C |
| 5,692,062 A | * | 11/1997 | Lareau et al. ............... | 382/107 |
| 5,724,125 A | * | 3/1998 | Ames ........................ | 356/28.5 |
| 5,825,540 A | | 10/1998 | Gold et al. | |

(Continued)

*Primary Examiner*—Thomas H. Tarcza
*Assistant Examiner*—Hien Ly
(74) *Attorney, Agent, or Firm*—Nelson Adrian Blish

(57) ABSTRACT

A method for display of radar data includes performing a first radar scan to obtain, for at least one object (24), a first range reading, a first azimuth reading, and a first altitude reading. A second radar scan is then performed to obtain, for the at least one object (24), a second range reading, a second azimuth reading, and a second altitude reading. Position and travel direction of the at least one object (24) are computed within a predetermined cylindrical volume (20), according to readings from the first and second radar scans. An icon (34) is assigned to the at least one object (24). A reference point (R) is determined for the predetermined cylindrical volume. The icon (34) is then displayed within the predetermined cylindrical volume (20) in stereoscopic form.

8 Claims, 16 Drawing Sheets

U.S. PATENT DOCUMENTS

| | | | |
|---|---|---|---|
| 5,861,846 A * | 1/1999 | Minter | 342/443 |
| 6,018,307 A * | 1/2000 | Wakayama et al. | 342/26 D |
| 6,055,477 A * | 4/2000 | McBurney et al. | 701/207 |
| 6,119,067 A * | 9/2000 | Kikuchi | 701/300 |
| 6,181,271 B1 * | 1/2001 | Hosaka et al. | 342/33 |
| 6,186,006 B1 * | 2/2001 | Schmitz et al. | 73/598 |
| 6,198,426 B1 * | 3/2001 | Tamatsu et al. | 342/70 |
| 6,198,428 B1 * | 3/2001 | Sekine | 342/176 |
| 6,208,318 B1 | 3/2001 | Anderson et al. | |
| 6,225,891 B1 * | 5/2001 | Lyons et al. | 340/435 |
| 6,333,757 B1 * | 12/2001 | Faris | 348/60 |
| 6,483,453 B2 * | 11/2002 | Oey et al. | 342/29 |
| 6,535,158 B2 * | 3/2003 | Wilkerson et al. | 342/26 D |
| 6,597,305 B2 * | 7/2003 | Szeto et al. | 342/26 R |
| 6,690,451 B1 * | 2/2004 | Schubert | 356/3.14 |
| 6,750,806 B2 * | 6/2004 | Fischer | 342/96 |
| 6,755,532 B1 | 6/2004 | Cobb | |
| 6,809,679 B2 * | 10/2004 | LaFrey et al. | 342/37 |
| 6,819,265 B2 * | 11/2004 | Jamieson et al. | 340/962 |
| 6,834,961 B1 | 12/2004 | Cobb et al. | |
| 6,909,381 B2 * | 6/2005 | Kahn | 340/945 |
| 7,034,742 B2 * | 4/2006 | Cong et al. | 342/70 |
| 2001/0014172 A1 * | 8/2001 | Baba et al. | 382/154 |
| 2002/0113865 A1 * | 8/2002 | Yano et al. | 348/47 |
| 2002/0149585 A1 * | 10/2002 | Kacyra et al. | 345/428 |
| 2002/0180631 A1 * | 12/2002 | Alon | 342/37 |
| 2003/0004613 A1 * | 1/2003 | Hahn et al. | 701/1 |
| 2003/0006930 A1 * | 1/2003 | Lodwig et al. | 342/120 |
| 2003/0160862 A1 * | 8/2003 | Charlier et al. | 348/14.08 |
| 2003/0160866 A1 * | 8/2003 | Hori et al. | 348/116 |
| 2004/0156400 A1 * | 8/2004 | Caplan et al. | 372/5 |
| 2004/0247175 A1 * | 12/2004 | Takano et al. | 382/154 |
| 2005/0137477 A1 * | 6/2005 | Kockro | 600/437 |
| 2005/0151839 A1 * | 7/2005 | Ito et al. | 348/51 |
| 2005/0200515 A1 * | 9/2005 | Cherniakov | 342/51 |
| 2005/0206551 A1 * | 9/2005 | Komiak et al. | 342/42 |
| 2006/0103572 A1 * | 5/2006 | DeAgro | 342/120 |
| 2006/0203335 A1 * | 9/2006 | Martin et al. | 359/462 |
| 2006/0239539 A1 * | 10/2006 | Kochi et al. | 382/154 |

* cited by examiner

STEREO DISPLAY FOR POSITION SENSING SYSTEMS

FIELD OF THE INVENTION

This invention relates to stereoscopic displays and more particularly relates to a display apparatus and method for stereoscopic presentation of position-sensing data.

BACKGROUND OF THE INVENTION

Various types of radar systems are used in government and military applications, such as for early warning devices that show the approach of aircraft, missiles, ships, and land vehicles. Conventionally, a flat, circular CRT serves as the radar display, showing dots or "blips" for detected objects, updated with each sweep of the radar signal. Fiducial "rings" on the CRT surface help to indicate range increments. For many types of applications, this type of two-dimensional display has proved sufficiently usable for skilled operators who can interpret the displayed data.

Civilian air traffic control systems also use radar as a means for tracking and guiding aircraft movement. For this type of application, however, the limitations of the conventional CRT display are most readily apparent. Two dots appearing on the flat CRT screen may indicate aircraft that are at very different altitudes, for example. It requires highly skilled personnel to interpolate between the limited scope of the radar display CRT and the three-dimensional, real-world objects that are represented, particularly since the tracked objects are in motion. As air traffic continues to grow in volume, there are increased risks for mistakes that can jeopardize life and property.

Although the CRT only represents two-dimensional data, the radar system itself actually obtains three-dimensional data on detected moving objects. As shown in FIG. 1A, the radar scan from a radar scanner 10, directed along a cone 26, provides information on elevation and azimuth angle A for detected objects such as aircraft 12. In addition, transponder apparatus 14 on each aircraft 12, often incorporating Global Positioning System (GPS) capabilities, provide information such as altitude and air speed. Thus, with no change to existing radar tracking systems, there is already sufficient information available to locate an airborne object within a volume in a cylindrical coordinate system 20 as shown in FIG. 1B, with fiducial rings 16 for altitude, such as one every 5,000 feet, for example. However, as FIG. 1C shows, a conventional CRT radar display 18 shows only blips 22 that correspond to aircraft 12 position. Conventional radar display 18 is unable to show elevation data graphically; instead, many systems display text information about altitude and air speed next to each blip 22. Thus, the data displays in a compressed manner, as if the observer were looking downward on the cylindrical space of FIGS. 1A and 1B. As a further drawback, conventional display methods do not indicate aircraft 12 direction on an instantaneous basis; this data must be inferred from observation.

There have been a number of solutions proposed for stereoscopic and three-dimensional imaging that can be used in radar avionic applications. For example:

U.S. Pat. No. 4,805,015 (Copeland) discloses the use of widely spaced sensors on a plane for providing left- and right-images for improved depth perception of another aircraft or object;

U.S. Pat. No. 5,825,540 (Gold et al.) discloses a pupil-based autostereoscopic display for viewing an object from multiple locations; and U.S. Pat. No. 6,208,318 (Anderson et al.) discloses a display for a volumetric image, supplemented by a two dimensional display.

It can be appreciated that there would be significant benefits to a display system that provided a stereoscopic, three-dimensional view of radar and tracking system data. Equipped with such a display, an air traffic controller could be provided with a view of the full volume of air space around an airport, for example. Such a display could use data from a single radar system to render a viewable stereo representation, rather than requiring that two separate radar systems provide two separate image sources, as is typically needed for conventional stereo image forming apparatus.

SUMMARY OF THE INVENTION

The present invention is directed to overcoming one or more of the problems set forth above. Briefly summarized, according to one aspect, the present invention provides a method for display of radar data comprising:

(a) performing a first radar scan to obtain, for at least one object, a first range reading, a first azimuth reading, and a first altitude reading;

(b) performing a second radar scan to obtain, for the at least one object, a second range reading, a second azimuth reading, and a second altitude reading;

(c) computing the position and travel direction of the at least one object within a predetermined cylindrical volume, according to readings from the first and second radar scans;

(d) assigning an icon to the at least one object;

(e) determining a reference point for display of the predetermined cylindrical volume; and (f) displaying the icon, within the predetermined cylindrical volume, in stereoscopic form.

It is a feature of the present invention that it uses data from multiple radar scans by a single radar device to display stereoscopic data.

It is an advantage of the present invention that it provides an effective way to adapt radar for viewing in three dimensions. This data can then be used to provide a stereoscopic visualization of detected objects, using any of a number of stereoscopic and autostereoscopic displays.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Forming a Stereoscopic Image

The present invention uses radar data from successive scans along with related tracking apparatus data in order to generate a stereoscopic image. In order to better understand the operation of the present invention, it is first useful to review how stereoscopic images are formed.

The term "stereoscopic image" implies that a pair of images is formed: one right eye image and one left eye image. This pair of images can be more precisely termed as a stereoscopic pair of images. For the description that follows, the term stereoscopic image can be considered to be equivalent to a stereoscopic pair of images.

Figure 2A:
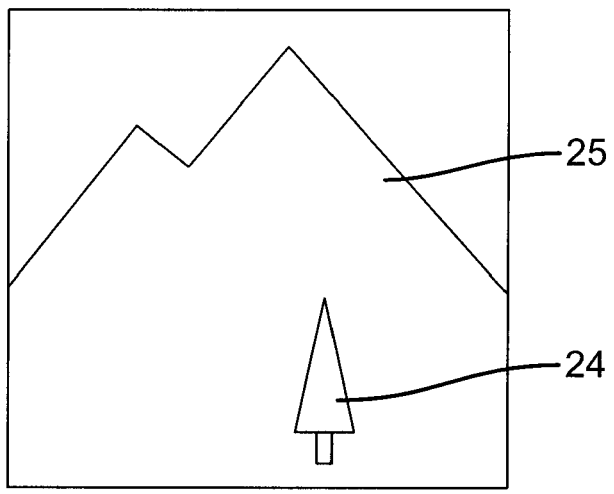
FIGS. 2A and 2B are left and right images of a scene for stereographic imaging.
Figure 2B:
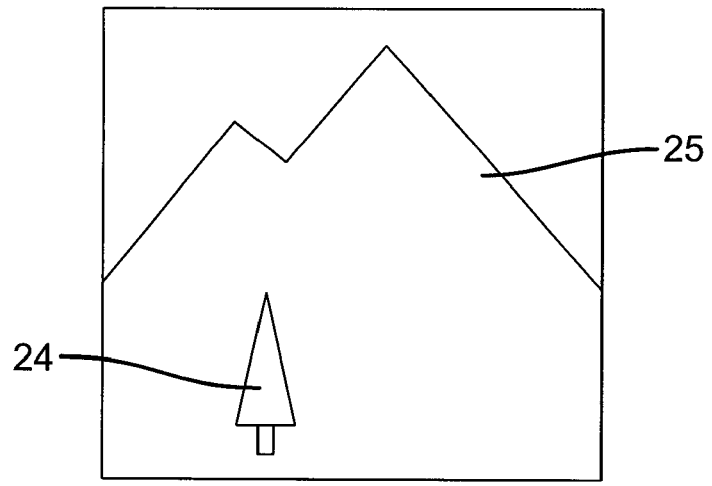

As a general principle, a stereoscopic image is formed by presenting each eye with an appropriate two-dimensional image, wherein the image for the left eye is at a slightly different lateral perspective from the image for the right eye. Referring to FIGS. 2A and 2B, there are shown left and right two-dimensional images respectively of a nearby object 24 and a distant object 25 from which a stereoscopic image can be obtained. Near objects 24, such as the tree depicted in FIGS. 2A and 2B, are laterally displaced to a noticeable degree between left- and right-eye images; distant objects 25, such as the mountain shown in FIGS. 2A and 2B, have proportionately less displacement relative to the frame of the image. The distance at which objects 25 have no displacement between left- and right-eye images is termed a zero parallax point. For zero parallax at infinity, distant objects 25 have little or no relative displacement.

Techniques for generating a stereoscopic pair of images such as those represented in FIGS. 2A and 2B from a set of image data are well known in the imaging arts. Software and hardware products conventionally used in video games, for example, are commercially available, including products from companies such as Nvidia Corporation, Santa Clara, Calif. Video games typically use commercially available DirectX software for stereo image manipulation, for example. More sophisticated computer aided design (CAD) and medical imaging systems typically use OpenGL software utilities for this purpose. OpenGL is a two-dimensional and three-dimensional graphics application programming interface (API). Additional features that add shading and texture are also available with commercial stereoscopic image-forming products.

In conventional practice, objects displayed three-dimensionally are represented within a volume by "wireframe" triangles and polygons. A three-dimensional wireframe is computed for each object, then transformed into a two-dimensional representation by projecting the wireframe shape onto a computed two-dimensional surface that is disposed at a suitable location. The wireframes are then assigned surfaces that represent the visible exterior form of the object. Imaging software then renders the surfaces, providing realistic textures, shading, and shadows. In this rendering, each pixel is typically represented by a data structure that provides color and distance information. For example, a 32-bit word may be assigned, with 8 bits for each color (Red, Green, and Blue, or RGB) and 8-bits for a z-axis distance that represents distance from the viewer. Objects having a short z-axis distance are close to the viewer and are rendered at a larger scale than objects having a longer z-axis distance. Thus, two objects having the same horizontal (x-axis) and vertical (y-axis) position are positioned relative to each other based on their z-axis distance. An object at a short z-axis distance may then block the visibility of another object at the same x- and y-axis position, but having a larger z-axis distance.

In early embodiments of visualization software, the computer central processing unit (CPU) had the task of performing the necessary calculations to provide two-dimensional renderings of three-dimensional data. More recently, dedicated processors from visualization processing vendors provide this function. For example, chip sets and dual graphics boards provided by Nvidia Corporation, such as the Quadro FX-1000 or FX-2000 hardware, relieve the CPU of these computation-intensive tasks. These processors are capable of generating both single two-dimensional images and stereoscopic left- and right-eye two-dimensional images using a wireframe model. Thus, a viewer can be presented with stereoscopic left- and right-eye images for display.

A three-dimensional appearance can be generated by moving the reference plane on which the two-dimensional image is formed from the three-dimensional wireframe image. By continuously moving this reference plane, an illusion of depth is thus provided by showing a textured, shaded, rotating three-dimensional object on a two-dimensional display. The type of view generated is commonly referred to as three-dimensional; however, this view is not truly stereoscopic. Creating a pair of two-dimensional views from slightly different perspectives at each reference plane location and presenting them to the observer in a stereo display allows rendering of a true stereoscopic image for viewing the rotating three dimensional object.

Conventional video games typically employ software such as Microsoft DirectX software for this image manipulation and representation function. Conventional CAD and medical imaging apparatus may employ tools such as OpenGL software for this purpose. For stereo rendering, a Quad Buffered Stereo Mode, supported by OpenGL software can be enabled. In many applications, a computer running this specialized software is set up for dual displays in a "clone" mode.

Thus, it can be seen that there are existing, commercially available tools for providing left- and right-eye stereo image pairs, for generating two-dimensional images from slightly different perspectives, as was noted with reference to FIGS. 2A and 2B, and for rotating an object as the reference viewpoint is changed. Supporting technologies for this purpose may also include shutter glasses that provide stereoscopic viewing.

Radar Scanning

Figure 1A:
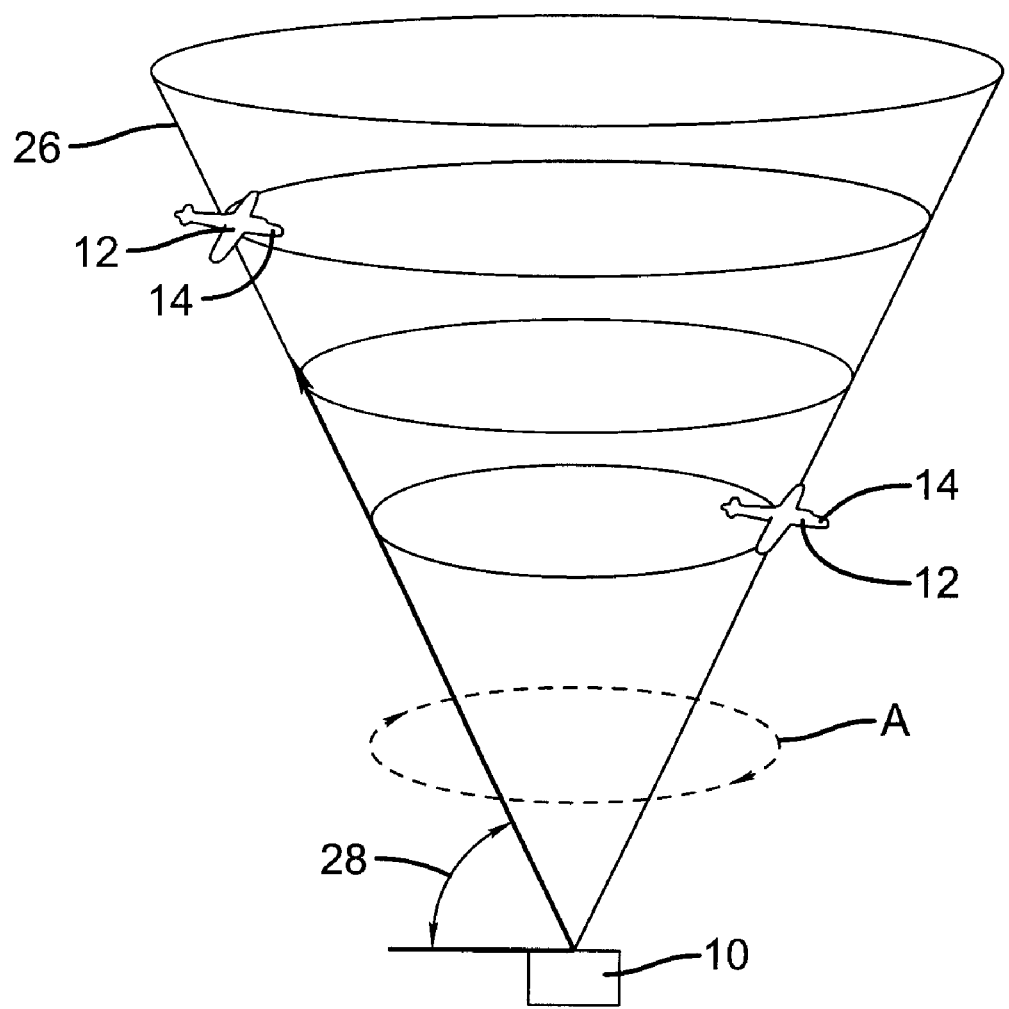
FIG. 1A is a perspective view of the cone volume that is scanned for aircraft tracking.

In order to understand how radar images are obtained, it is instructive to review how radar scanner 10 operates. Referring back to FIG. 1A, radar scanner 10 sweeps out a volume of cone 26 at a fixed elevation angle 28. The radar beam is repeatedly rotated through 360 degrees of azimuth A. For air traffic control applications, this beam is typically broad in the vertical direction and narrow in the horizontal direction. As the radar beam sweeps, short pulses of microwave energy are reflected from aircraft 12 or other obstruction and are detected by radar scanner 10. The range or distance to aircraft 12 is calculated from the transit time of the reflected pulses. Because the radar beam is typically much larger than aircraft 12, surface details are not readily discernable, only location coordinates.

As the radar beam is detected at aircraft 12, transponder apparatus 14 responds by transmitting data on altitude, air speed, type of aircraft, flight plan, and other information. This information is then available in addition to the range and azimuth positional data obtained. Using this capability, each radar scan gives sufficient range, azimuth angle, and altitude data to fix the location of an aircraft within a volume surrounding the radar system.

Procedure for Forming an Image

The present invention utilizes two or more successive sweeps of the beam from radar scanner 10 to generate a stereo representation of aircraft 12 location and trajectory. Then, employing conventional algorithmic techniques, additional information on trajectory can be calculated and stereo images from slightly different perspectives obtained, as was described with reference to FIGS. 2A and 2B. The stereo images can then be displayed on a suitable display system.

The overall procedure for forming images according to the present invention can be illustrated with reference to FIG. 3. The basic steps for a system with a single radar scanner are as follows:

(i) Perform a first radar scan to obtain, for at least one object, a first range reading, a first azimuth reading, and a first altitude reading.

(ii) Perform a second radar scan to obtain, for the at least one object, a second range reading, a second azimuth reading, and a second altitude reading.

(iii) Compute, from the readings obtained in first and second radar scans, the position and travel direction of the at least one object within a predetermined cylindrical volume.

(iv) Assign an icon to the at least one object.

(v) Determine a reference point for display of the predetermined cylindrical volume.

(vi) Display the icon, within the predetermined cylindrical volume, in stereoscopic form.

Figure 3:
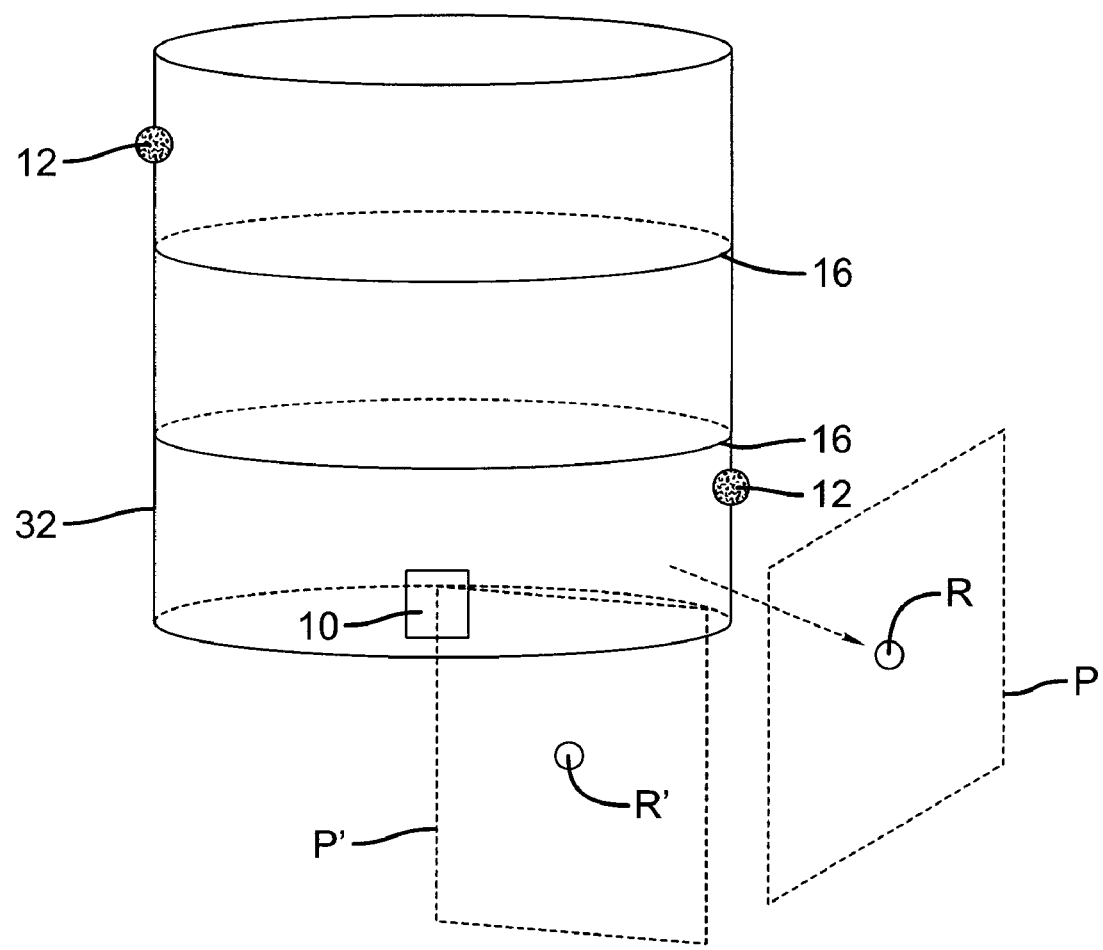
FIG. 3 is a perspective view of a cylindrical coordinate system for radar detection, showing key aspects of the present invention.

For forming a stereoscopic pair of images, two slightly different laterally displaced reference points are used, as represented by R and R' in FIG. 3. The three-dimensional image of the area of interest (for example, the space of cylinder 32 in FIG. 3) is projected onto a plane P or P' respectively through reference points R and R'. The selection of suitable reference points R and R' is made according to the conventional practices outlined above for three-dimensional viewing, by processing logic that determines the optimal view location for left and right eye images of the stereoscopic pair of images.

The first and second radar scans in steps (i) and (ii) may be temporally spaced at variable intervals. Multiple scans of the same moving object, at different times, allow a continuously moving icon to be rendered from the data. The predetermined volume is typically the volume scanned by the radar, such as cone 26 in FIG. 1A or cylinder 32 in FIG. 1B and FIG. 3.

Figure 6A:
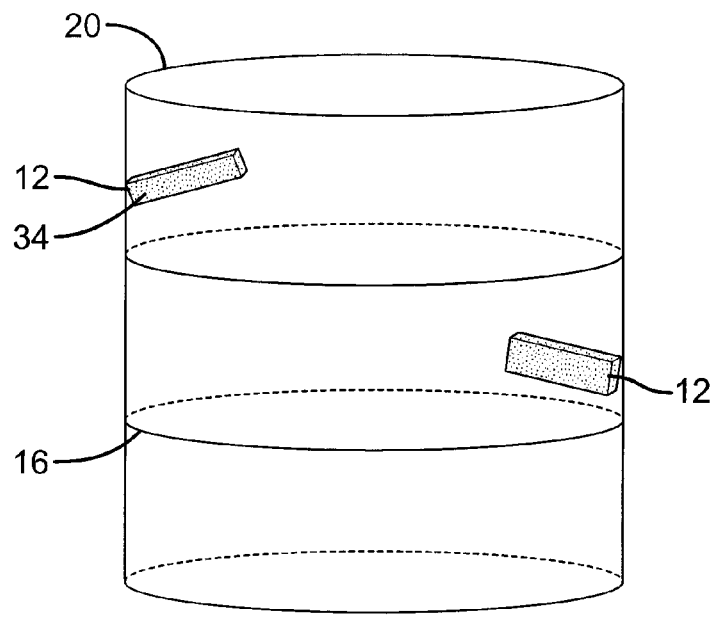
FIGS. 6A and 6B are perspective views showing different rotations of the volume displayed by the apparatus of the present invention.
Figure 6B:
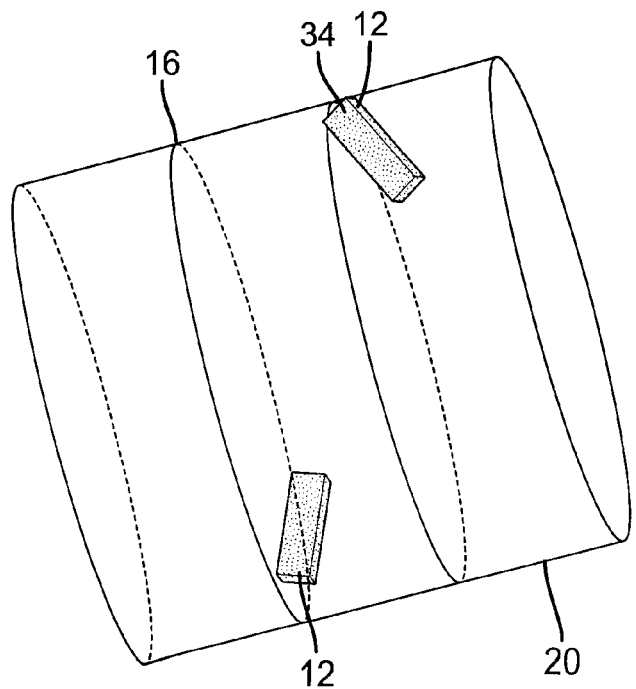

Steps (i)-(vi) above apply for each stereoscopic image obtained and are repeated in order to display the position of the continuously moving object, updating the position of the assigned icon accordingly. Reference point R may be outside of the volume, as shown in FIG. 3, or from some location inside the volume. Reference point R can be shifted to provide a different view of cylinder 32 or other defined volume. From an imaging perspective, plane P is constructed through reference point R, as shown in FIG. 3. The three-dimensional wireframe objects in cylinder 32 are projected onto plane P through reference point R as two-dimensional images. As the location of reference point R is moved around cylinder 32, and successive two-dimensional images are generated and displayed on a two-dimensional screen, cylinder 32 and the objects within it then appear to rotate. Referring to FIGS. 6A and 6B, there are shown two differently rotated three-dimensional views of cylindrical coordinate system 20 that provides the volume for radar data. Fiducial rings 16 and icons 34 provide additional data on the positions of aircraft 12 (preferably represented by icon 34) in these views.

To rotate an object as a stereoscopic image, changing the reference point of step (v) above, the imaging software changes the assignment of its reference plane, so that the three-dimensional icon is projected onto a pair of reference planes at slightly different lateral positions, thereby allowing updated two-dimensional images to be formed for left- and right-eye viewing at each position to which the reference planes are moved.

Using steps (i)-(vi) above allows an improved display capability relative to conventional radar CRT displays, allowing three-dimensional views of airspace from any of a number of different perspectives. Actual altitudes for aircraft 12 can thus be graphically represented and displayed from a number of perspectives.

Determining and Representing Direction

Figure 4A:
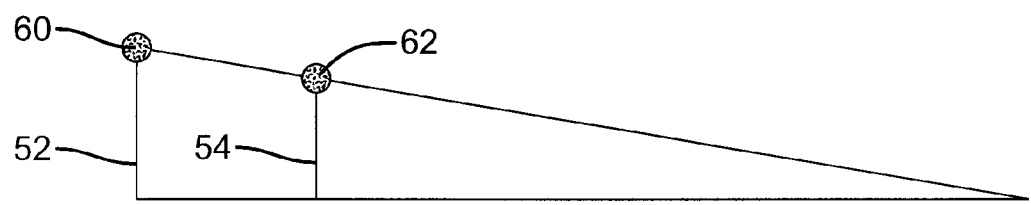
FIGS. 4A, 4B, and 4C are diagrams showing how object direction can be determined from radar data.
Figure 4B:
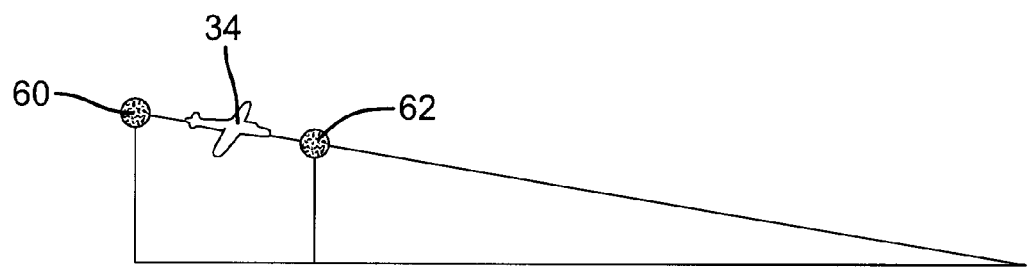

In addition to position, the method and apparatus of the present invention also allow display of aircraft 12 type and direction. Referring to FIG. 4A, a first radar scan detects an airborne craft at a first coordinate point 60 with a first altitude reading 52. This first scan detects the position used to represent the tail of the aircraft. Subsequently, radar detects the craft at a second coordinate point 62 with a second altitude reading 54. This second scan detects the position used to represent the nose of the aircraft. From the data obtained for coordinate points 60 and 62, direction can be determined, using basic trigonometric operations. An icon 34 can then be centered at the computed average range and the average altitude of the two readings, with the tail of the icon toward the first range/altitude reading and the nose toward the second reading. In the example of FIG. 4B, icon 34 represents an aircraft approaching and descending.

As was noted in the background material given above, altitude data is typically obtained from on-board transponder apparatus 14. In addition, information on the type of aircraft 12 is typically also available. This additional information makes it possible to graphically represent aircraft 12 type as well as direction, as shown in FIG. 4B. Icon 34 is stored and represented by display logic as a three-dimensional object.

Figure 4C:
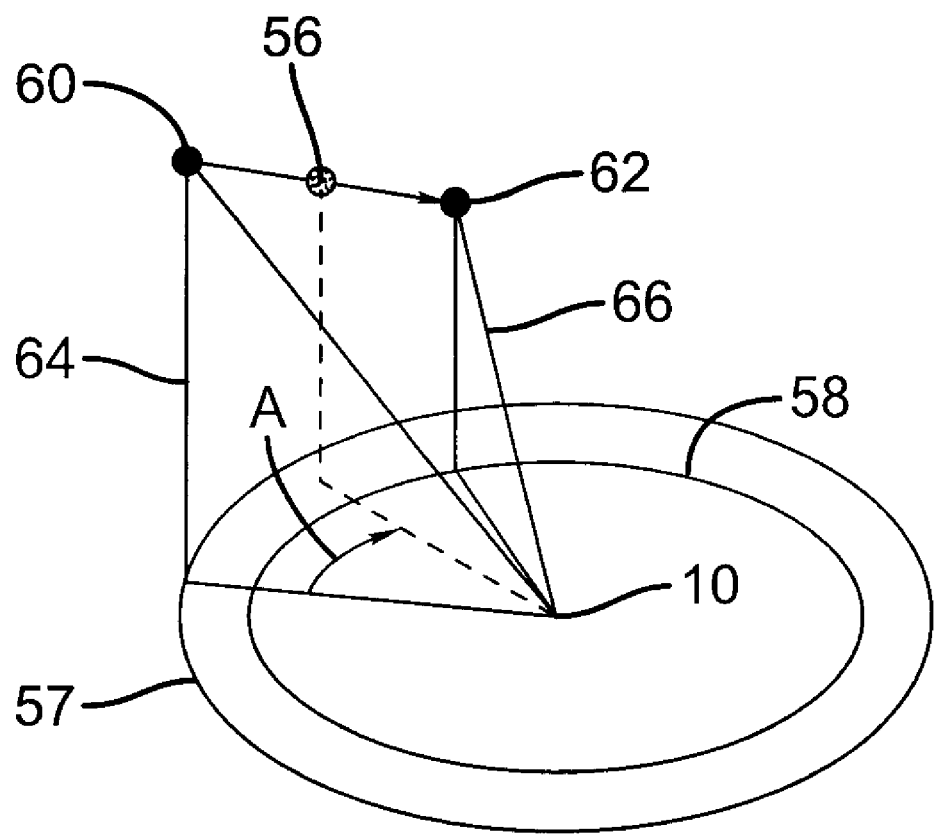

Referring to FIG. 4C, an azimuth angle A change in position can also be represented. For this calculation, coordinate points 60 and 62 are used to determine two radially separated right triangles 64 and 66 as shown, with an interpolated point 56 identified between coordinate points 60 and 62. These, in turn, determine the radii of two concentric circles 57 and 58 that represent ground distance. Ground distances are computed using the range and altitude data and using geometric and trigonometric relationships of a right triangle.

Figure 1B:
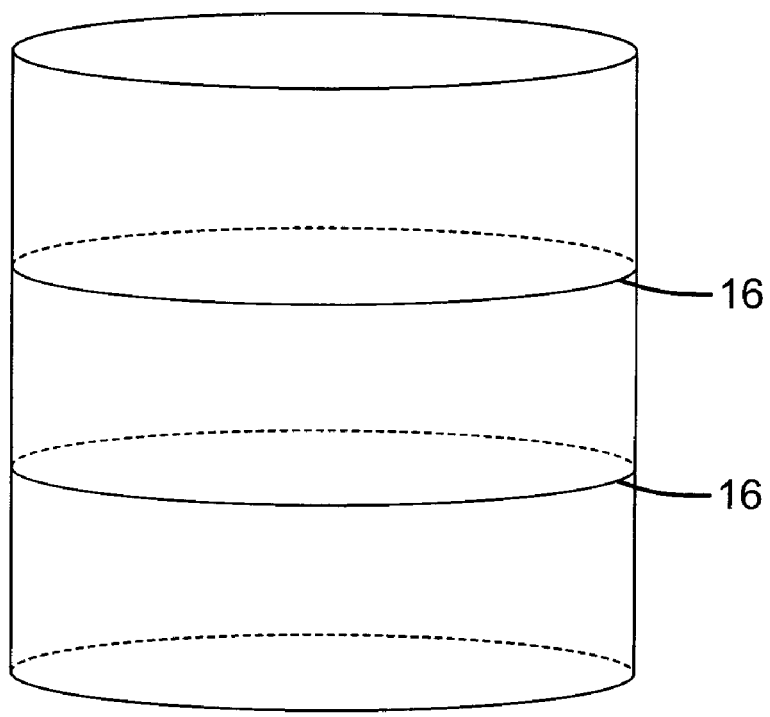
FIG. 1B is a perspective view of a cylindrical coordinate system for radar detection.

In addition to inventive use of icons 34, the present invention also allows the use of reference markings such as fiducial rings 16 in FIG. 1B. Various types of reference marking can be used to indicate graphical information that is useful for three-dimensional display, where these reference markings can be rendered in stereo.

In addition, various types of tracking pattern could be displayed. For example, the trajectory of an aircraft over an interval of time can be rendered to show a previous travel path by maintaining transparent vestigial images showing previous position, with these images increasingly transparent with time, creating a "ghosting" effect. In addition, forward projection of trajectories can be computed and rendered in a similar manner to predict an anticipated travel path, as an aid in detecting possible collisions, for example. In one embodiment, forward projection of an aircraft's course simply interpolates the anticipated travel path by extending the travel path information obtained with reference to FIGS. 4A and 4B. That is, the anticipated travel path is on a line traced through coordinate points 60 and 62 in FIG. 4B. Other more complex factors can be taken into account, such as for a takeoff or landing pattern, for example.

Color coding of objects and markers may also be useful for identifying large aircraft with more turbulent wakes, for indicating an aircraft type (such as private, commercial, or military) or for defining altitude corridors. Such optional tracking and display enhancement features could be enabled for all objects or markers, or enabled/disabled selectively by the viewer. For example, a "ghosting" or tracking pattern function or a predictive tracking utility that shows the most likely travel path may be helpful where air traffic is light to moderate; however, these enhancements could tend to obscure visibility in heavy traffic and thus would need to be disabled.

Display Apparatus

While the image forming techniques of the present invention could be suitably adapted to any of a number of different types of displays, there would be particular advantages to a display that provides good depth perception and is well-suited to three-dimensional display. A display system of this type that provides a virtual image using pupil imaging is disclosed in commonly-assigned U.S. Pat. No. 6,755,532 (Cobb), incorporated herein by reference.

Figure 5:
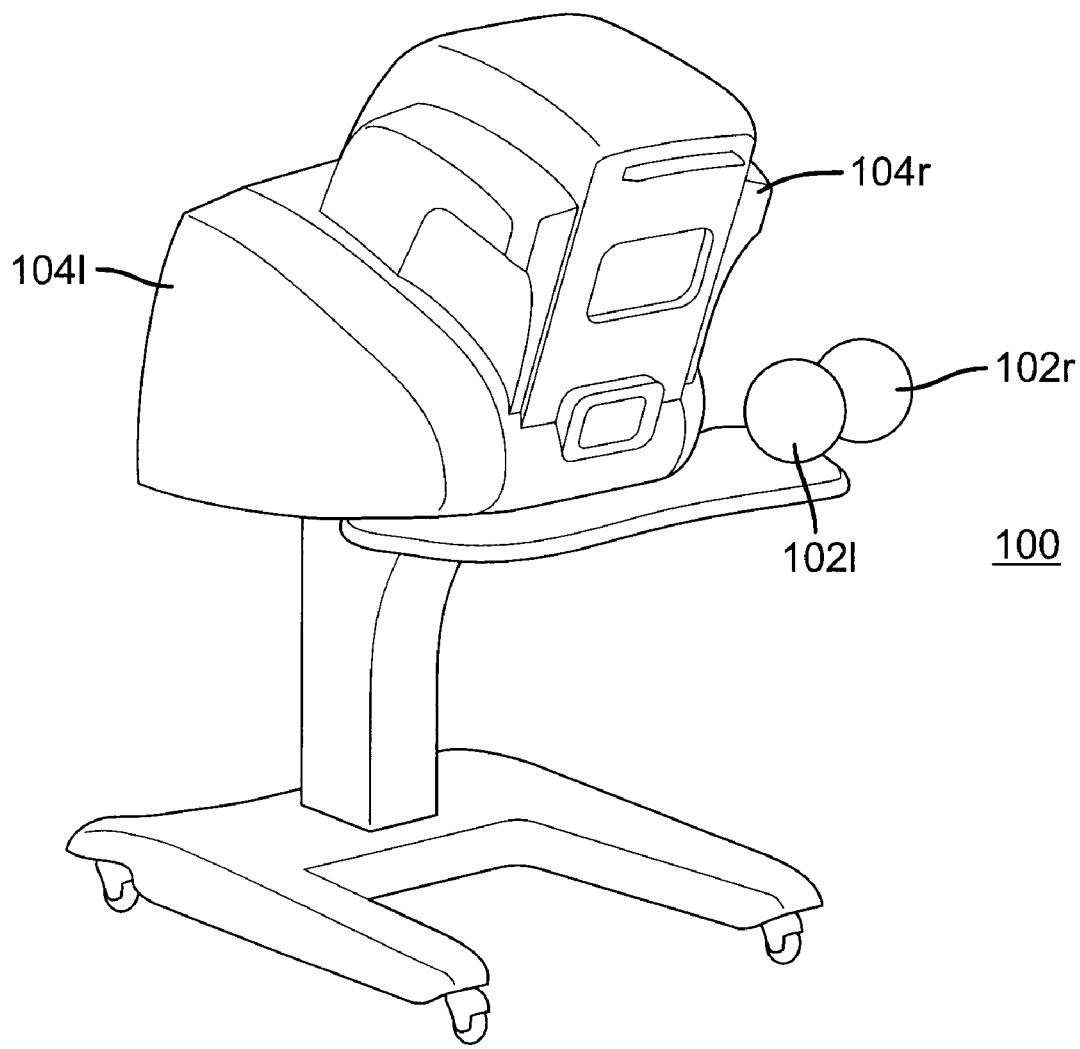
FIG. 5 is a perspective view showing a display apparatus according to the present invention.
Figure 8:
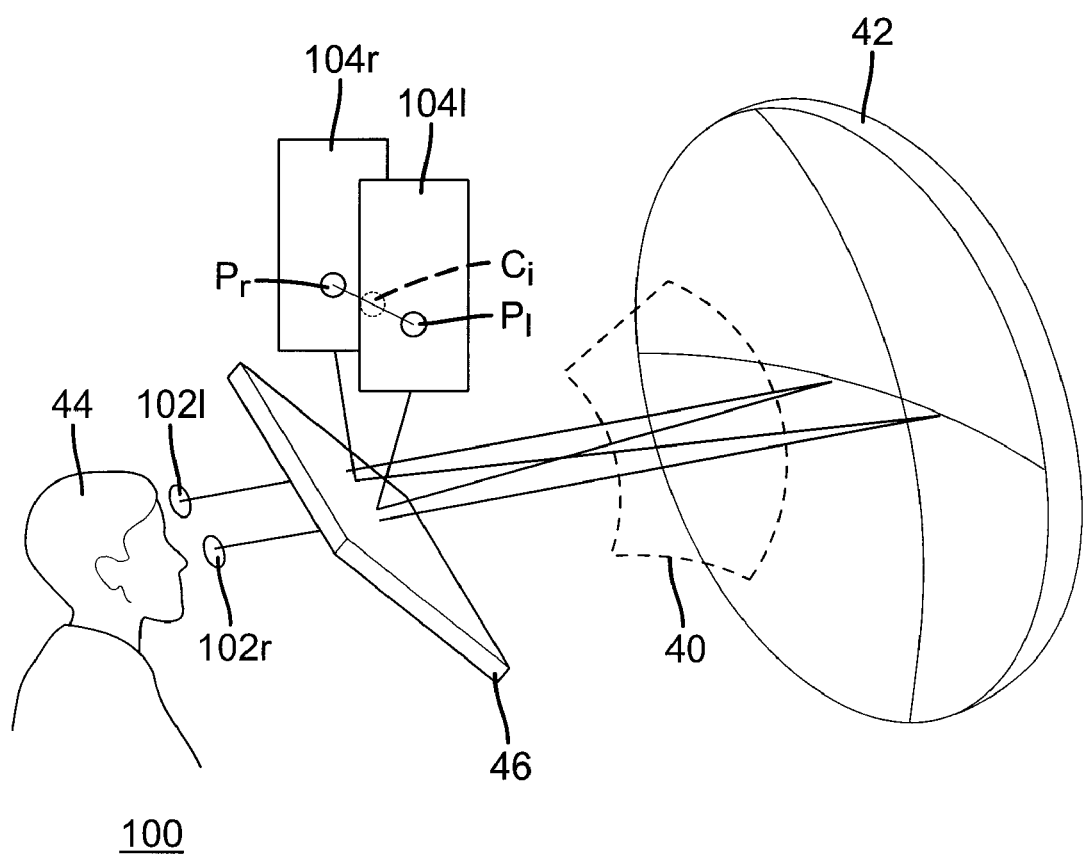
FIG. 8 is a perspective view showing basic components of an autostereoscopic display apparatus in one embodiment.

FIG. 5 shows a perspective view of an autostereoscopic display apparatus 100 in a compact embodiment. FIG. 8 shows a schematic of autostereoscopic display apparatus 100, with respective positions of key optical components represented. Autostereoscopic display apparatus 100 forms left and right viewing pupils 102*l* and 102*r* for a viewer 44 and displays a stereoscopic virtual image without requiring the use of headgear, polarized glasses, or other supporting devices. Two separate virtual images are formed from corresponding real images, as described in U.S. Pat. No. 6,755,532. One virtual image is provided by a left image generation system 104*l* and the other by a right image generation system 104*r*. A beamsplitter 46 directs the light to form an intermediate image 40 for each left and right image generation system 104*l*, 104*r* at a focal plane of a curved mirror 42. Pupils $P_l$ and $P_r$ in left and right image generation system 104*l*, 104*r* are optically conjugate with left and right viewing pupils 102*l* and 102*r* and are very near the center of radius $C_r$ of curved mirror 42. As a result of this optical arrangement, a virtual image is formed, utilizing an optical effect in which an object appears as if located at a distance beyond the surface of curved mirror 42.

Because it provides good depth perception and a wide field of view, the virtual image provided by autostereoscopic display apparatus 100 is particularly advantageous for the three-dimensional display requirements of the present invention.

Displayed Data

Autostereoscopic display apparatus 100 is particularly capable for the three-dimensional display requirements of the present invention. Referring to FIGS. 6A and 6B, there are shown two differently rotated three-dimensional views of cylindrical coordinate system 20 that provides the volume for radar data. Fiducial lines 16 and icons 34 provide additional data on the positions of aircraft 12 in these views.

Alternate Embodiment for Display of Doppler Radar Data

The present invention is well-suited for displaying aircraft and other fast moving objects that are detected from a single radar system. With slight modification, the apparatus and methods of the present invention can also be adapted for use with any of a number of types of radar systems, and with pairs of radar systems. For example, the present invention would be particularly useful for Doppler radar, widely used in tracking meteorological formations for obtaining weather data. In conventional "storm chaser" applications, multiple mobile Doppler radar units are mounted on moving vehicles that can then effectively track storm movement and development.

Figure 7:
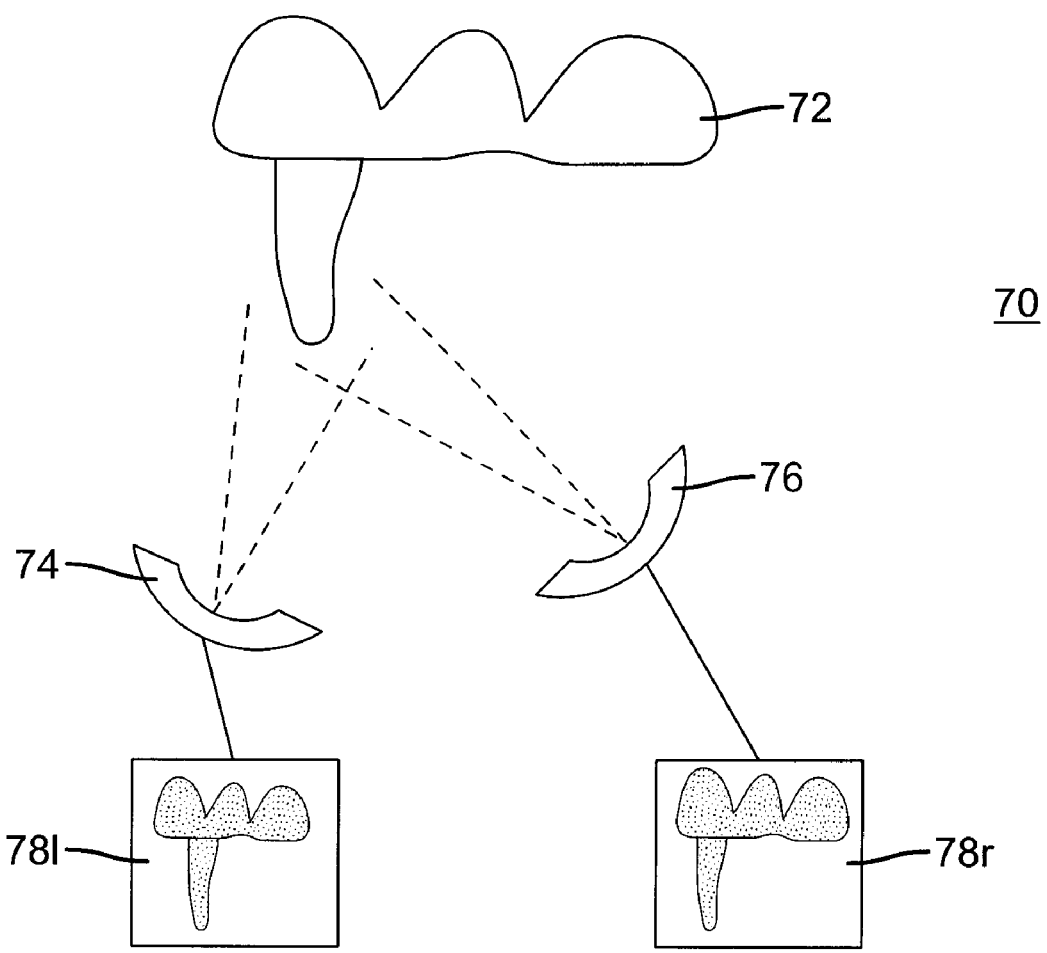
FIG. 7 is a schematic diagram of an embodiment using two Doppler radar systems.

FIG. 7 shows conceptually how a stereoscopic image pair can be obtained from a Doppler radar system 70. A tornado 72 is tracked by Doppler radar units 74 and 76 that form left and right images 78*l* and 78*r* of a stereoscopic pair thereby.

The output of a single Doppler radar unit 74 is a time sequence of images which are generally color coded to show reflected energy intensity or wind speed and direction, rather than a single "blip" as with an airport radar for air traffic control. That is, the Doppler target is very large compared to the radar wavelength and beam size. Motor vehicles using Doppler radar unit 74 can produce a two-dimensional image of a storm. With one vehicle to the left of a storm and one to the right, two separate two-dimensional sequences of images can be produced, as shown in FIG. 7. With autostereoscopic display 100 (FIG. 8), or similar stereoscopic display device, the image sequence from the vehicle on the left provides the source image visible from left viewing pupil 102*l*, and the sequence from the vehicle on the right provides the source image visible from right viewing pupil 102*r*. An observer thus sees storm development in stereo. In addition, it can also beneficial to record both sequences of images such that a storm formation such as tornado 72 can be replayed for careful study.

Each Doppler radar unit 74, 76 actually receives three-dimensional data (range, azimuth, and elevation) that is processed to present the two-dimensional image. Typically, a single Doppler radar provides a narrow scanning beam of about 0.5 degrees, both horizontally and vertically. As this beam sweeps around at a given elevation angle for a full 360 degree rotation or portion thereof, the Doppler radar senses return data for each azimuth angle based on range and/or intensity of the reflection. This data is then conventionally displayed on a two dimensional screen as a 360 degree swath (or corresponding portion) at some radius from the location of radar unit 74, 76, with the data color coded according to the strength of the reflected radar energy. The image updates as the radar sweeps around in azimuth, providing a continuously changing top-down view of storm clouds or similar phenomenon around the radar location. Doppler radar unit 76 on the right side of the storm provides the right-eye image. Doppler radar unit 74 on the left side of the storm provides the left eye image.

In the conventional Doppler mode, the displayed data can be coded to show wind speed and direction. Neither of these top down viewing modes is particularly useful for stereo viewing, however, because nearer cloud formations simply appear to be taller, due to the greater disparity of closer objects.

Figure 1C:
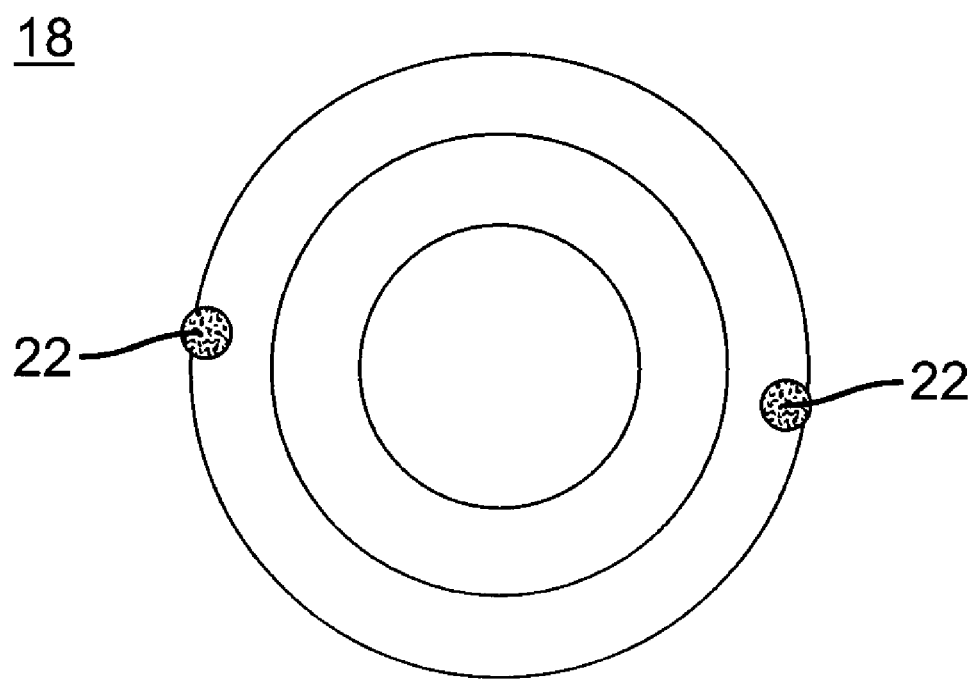
FIG. 1C is a plan view of a conventional radar display.

Unlike the air traffic radar of the FIG. 1 embodiment, Doppler radar typically sweeps at different elevation angles, varying by 0.5 degree or smaller increments, starting at about 0.5 degrees above the horizon and progressively incremented up to about 20 or 25 degrees. This defines a set or sequence of discrete elevation angles over which Doppler radar unit 74 scans. Similarly, Doppler radar unit 74 scans at each of a set or sequence of discrete azimuthal angles. For the apparatus of the present invention, this elevation and azimuthal scan data allows a side view of a storm or other meteorological formation. The full 360 degree azimuth scan that is conventionally used for Doppler radar is not needed; the radar scan can be truncated, or the image processing software restricted to a smaller azimuth angular range, such as 90 degrees, for example.

Figure 9:
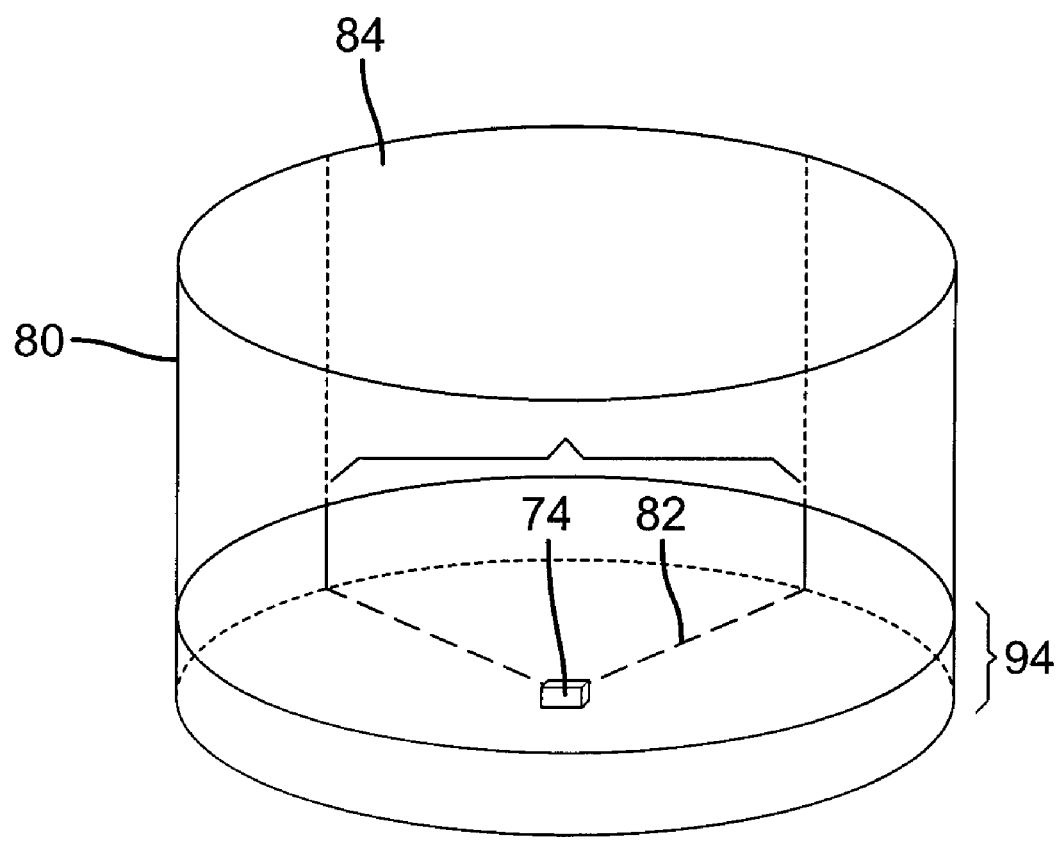
FIG. 9 is a perspective view of a cylindrical coordinate system for Doppler radar display according to an alternate embodiment.
Figure 10:
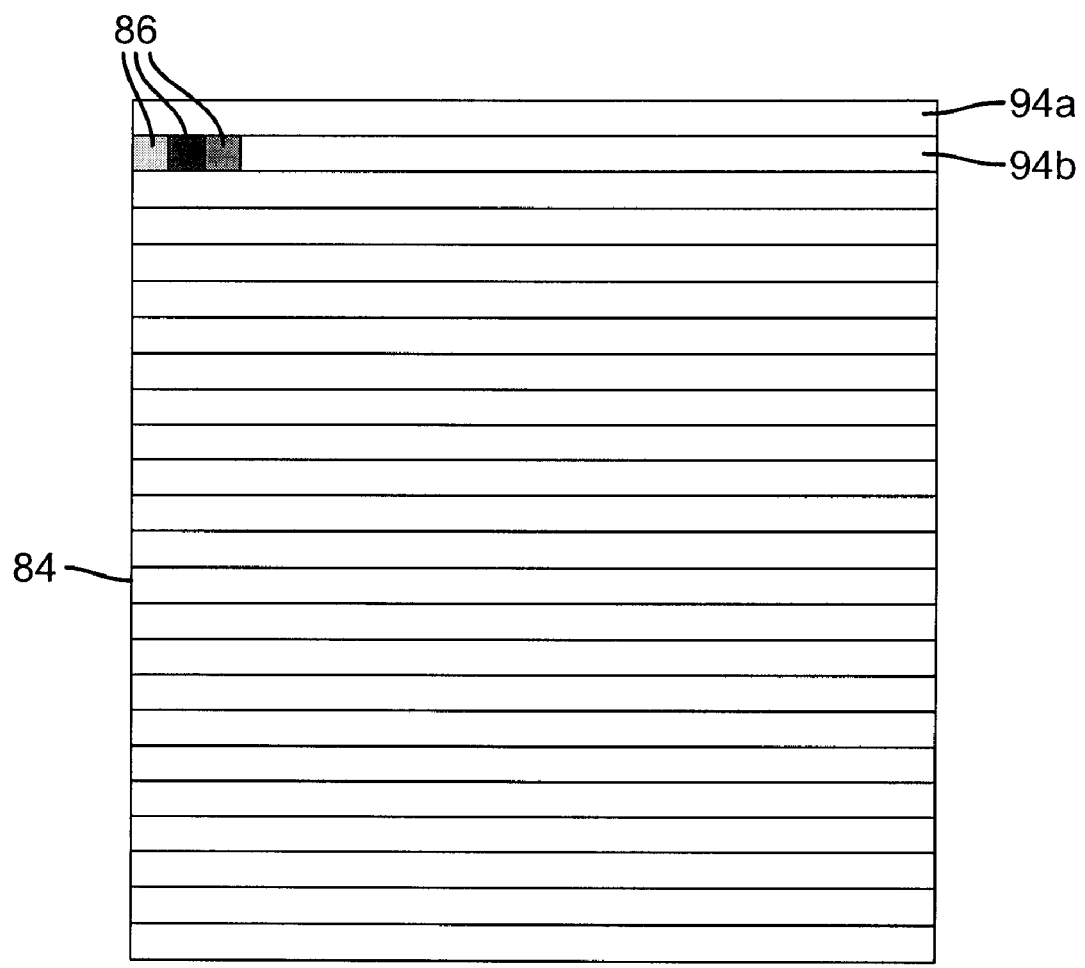
FIG. 10 is a block diagram showing how data from a Doppler radar system can be assembled as raster scan image data.

FIG. 9 shows a cylindrical coordinate system 80 generated by a 360 degree azimuth scan and a 90 degree portion 82 of that scan for one elevation sector 94 at one elevation angle in the cylindrical volume. Scans at successively higher elevation angles provide the scan lines of what can be assembled as a raster scan image 84, outlined by dotted lines in FIG. 9 and shown in plan view in FIG. 10. Raster scan image 84 is obtained at a given range or distance, shown as radius R from Doppler radar unit 74 for cylindrical coordinate system 80 in FIG. 9. FIG. 10 shows how raster scan image 84 can be assembled from Doppler radar readings for each successive elevation sector 94. The 90 degree azimuth scan at the highest elevation angle provides the scan line for elevation sector 94a at the top of the image. The next lower increment of the elevation angle provides the data for the second scan line at elevation sector 94b, and so on. Several pixels 86 at different intensity (represented as gray values) are shown at the beginning of the second scan line for elevation sector 94b. At each pixel 86 location in the scan line, any of a number of possible intensity values may be displayed, with each value corresponding to a detected intensity level within the range.

Figure 11A:
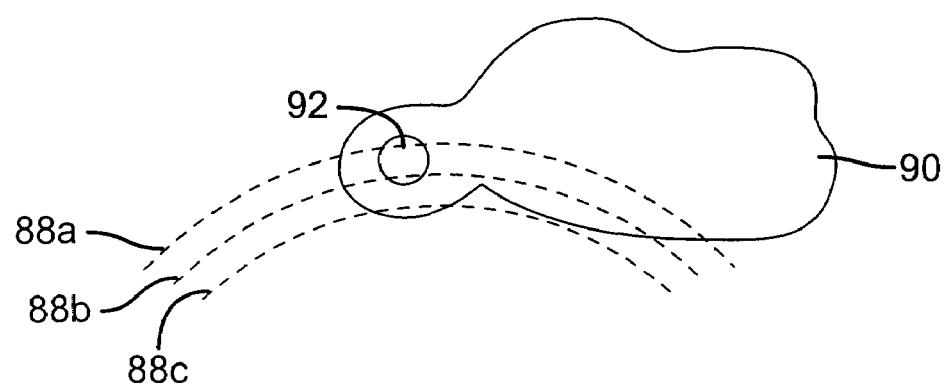
FIG. 11A is a top view of a storm formation.
Figure 11B:
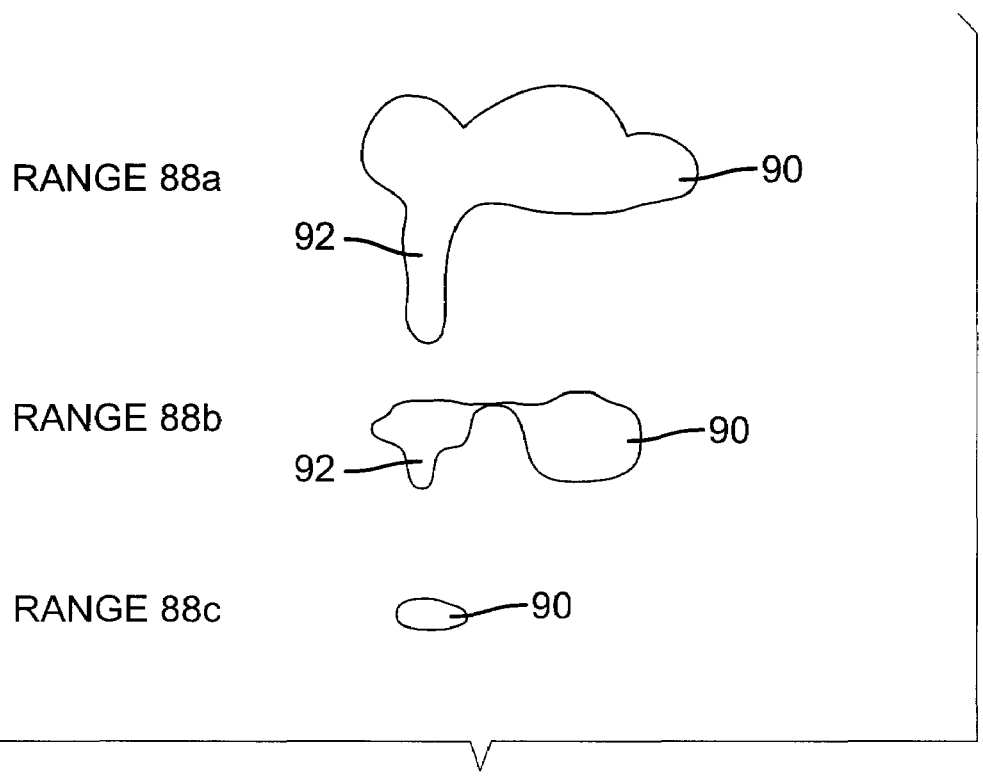
FIG. 11B is a block diagram showing different cross-sectional views of the storm formation of FIG. 11A.

Referring to FIG. 11A, there is shown a top view of a cloud formation 90 and an associated tornado 92. To provide a "surface" for viewing the side of cloud formation 90, an intensity threshold could be set, such that the first value exceeding that intensity threshold is displayed by the image processing software. Raster scan image 84 would thus indicate an atmospheric formation of a certain moisture density. Alternately, the intensity data for every pixel 86 in raster scan image 84 could be selected by range alone. As the range value is varied, the observer can create two-dimensional image "slices" of the storm in cross section. FIG. 11A shows three ranges 88a, 88b, and 88c. Based on which range 88a, 88b, or 88c is selected, a different cross-sectional slice of cloud formation 90 is obtained. FIG. 11B shows side views corresponding to each of ranges 88a, 88b, and 88c. In this example, range 88a extends through cloud formation 90 and tornado 92. Range 88b extends through cloud formation 90 and to the near edge of tornado 92. Range 88c extends only through an edge of cloud formation 90.

The above describes how a single, two dimensional image is rendered using a single Doppler radar system, employing image processing software and techniques well known in the art. In like manner to the method described for conventional radar scanning, a stereoscopic image can also be formed using Doppler radar. Here, however, two Doppler radar units 74 and 76, as shown in FIG. 7, are used. Each Doppler radar unit 74 and 76 forms its raster scan image of a meteorological formation 84 from a slightly different perspective view and can present these views simultaneously as right and left images in a stereoscopic display, allowing an observer to view a storm formation in stereoscopic form.

Two Doppler radar units 74 and 76, after standard composite processing, can provide a pair of two-dimensional images of a storm, as viewed from the side. Any horizontal disparity may need to be adjusted to get a comfortably fusible image, using techniques well known in the imaging arts. This disparity may vary from event to event, depending upon the location of radar units 74 and 76 and their distance from the storm. The level of adjustment necessary would depend, in part, on viewer preference and comfort.

Figure 12A:
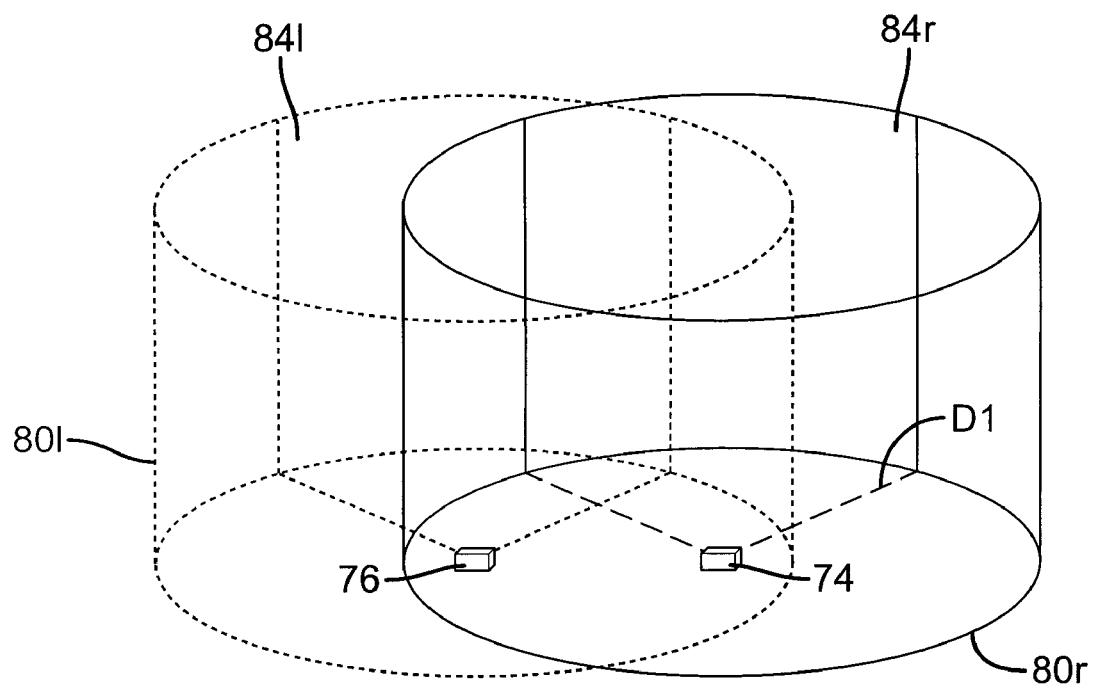
FIGS. 12A and 12B are perspective views of cylindrical coordinate systems for a pair of Doppler radar units.
Figure 12B:
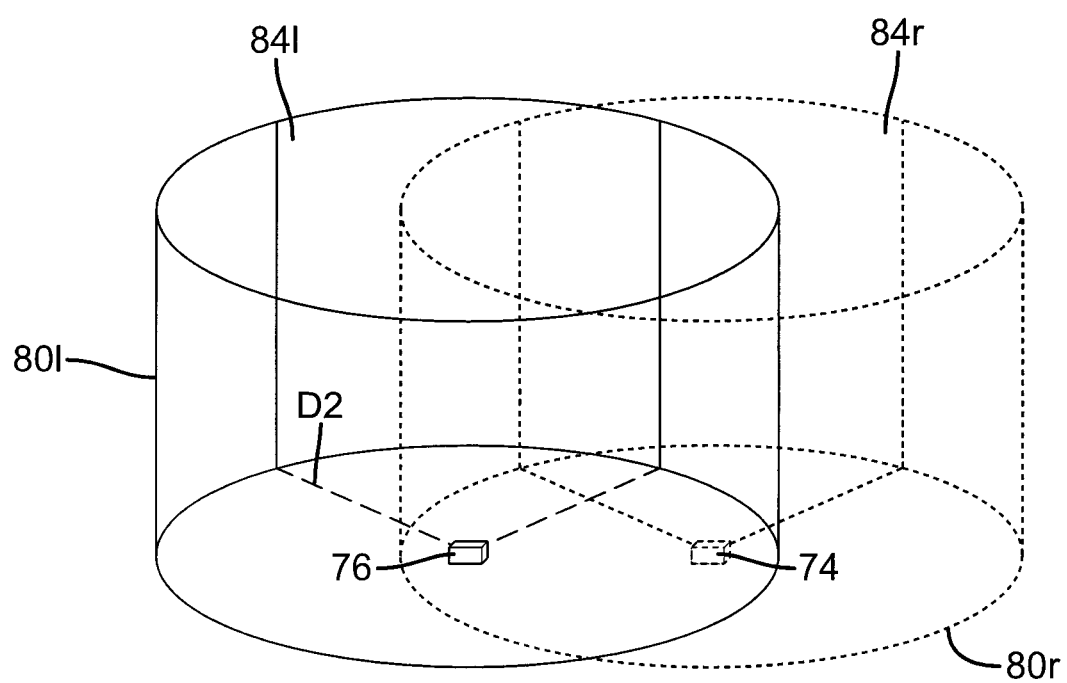

Referring to FIGS. 12A and 12B, there are shown the pair of left and right cylindrical coordinate systems 80l and 80r for forming left and right raster scan images 84l and 84r, respectively. Left and right cylindrical coordinate systems 80l and 80r are overlapping over the area of interest that provides left and right raster scan images 84l and 84r. FIG. 12A emphasizes right cylindrical coordinate system 80r with full lines and represents left cylindrical coordinate system 80l in phantom lines; FIG. 12B correspondingly emphasizes left cylindrical coordinate system 80l.

The method for obtaining a stereoscopic image using the arrangement of Doppler radar units 74, 76 as shown in FIGS. 7, 12A, and 12B can be summarized as follows:

(i) form right raster scan image 84r from Doppler radar unit 74 by obtaining, for each elevation angle in a first sequence of elevation angle values, and for each azimuth angle in a first sequence of azimuth angle values; at least one reading at a first distance D1;

(ii) form left raster scan image 84l from Doppler radar unit 76 that is spaced apart from radar unit 74 by obtaining, for each elevation angle in a second sequence of elevation angle values, and for each azimuth angle in a second sequence of azimuth angle values;

at least one reading at a second distance D2; and (iii) display right and left raster scan images 84r and 84l as a stereoscopic pair of images.

By using the three dimensional data from a given radar system or pair of systems and creating a projection of that data on a two dimensional reference plane as described herein, a two dimensional image from a specified viewpoint can be generated. By manipulating a reference plane and generating a series of two dimensional projected images, an airborne or land-based object or meteorological formation can be viewed from a preferred direction.

The invention has been described with reference to particular embodiments. However, it will be appreciated that variations and modifications can be effected by a person of ordinary skill in the art without departing from the scope of the invention. For example, alternative embodiments may use different types of display apparatus, including dual CRT monitors, LC displays, OLED displays, and others. The method of the present invention could be adapted for any number of radar types, both commercial and military, including, for example, Airborne Warning And Control System (AWACS) and Joint Surveillance Target Attack Radar System (JSTARS) apparatus.

Thus, what is provided is a display apparatus and method for stereoscopic presentation of position-sensing data.

PARTS LIST 10 radar scanner
12 aircraft
14 transponder apparatus
16 fiducial rings
18 radar display
20 cylindrical coordinate system
22 blips
24 object
25 object
26 cone
28 elevation angle
32 cylinder
34 icon
40 intermediate image
42 curved mirror
44 viewer
46 beamsplitter
52 first altitude reading
54 second altitude reading
56 point
57 circle
58 circle
60 first coordinate point
62 second coordinate point
64 right triangle
66 right triangle
70 Doppler radar system
72 tornado
74 Doppler radar unit
76 Doppler radar unit
78*l* left image
78*r* right image
80 cylindrical coordinate system
80*l* left cylindrical coordinate system
80*r* right cylindrical coordinate system
82 degree portion
84 raster scan image
84*l* left raster scan image
84*r* right raster scan image
86 pixel
88*a* range
88*b* range
88*c* range
90 cloud formation
92 tornado
94 elevation sector
94*a* elevation sector
94*b* elevation sector
100 autostereoscopic display apparatus
102*l* left viewing pupil
102*r* right viewing pupil
104*l* left image generation system
104*r* right image generation system

The invention claimed is:

1. A method for display of radar data comprising:
   (a) performing a first radar scan to obtain, for at least one object, a first range reading, a first azimuth reading, and a first altitude reading;
   (b) performing a second radar scan to obtain, for the at least one object, a second range reading, a second azimuth reading, and a second altitude reading;
   (c) computing a position and travel direction of the at least one object within a predetermined cylindrical volume, according to readings from the first and second radar scans;
   (d) assigning an icon to the at least one object;
   (e) determining at least a first reference point for display of the predetermined cylindrical volume; and
   (f) displaying the icon, within the predetermined cylindrical volume, in stereoscopic form.

2. A method according to claim 1 further comprising:
   (g) displaying at least one reference marking for the altitude of the at least one object.

3. A method according to claim 1 further comprising:
   (g) displaying a tracking pattern to trace a previous travel path of the at least one object within the volume.

4. A method according to claim 1 further comprising:
   (g) displaying a tracking pattern to predict an anticipated travel path of the at least one object within the volume.

5. A method according to claim 2 wherein the step of displaying at least one reference marking comprises displaying an altitude marking in stereoscopic image form.

6. A method according to claim 1 wherein the step of displaying the icon comprises the step of displaying the icon in a predetermined color.

7. A method according to claim 1 wherein the step of displaying the icon in stereoscopic form comprises:
   projecting the icon onto a first plane on which the first reference point lies;
   forming a first image according to the projection onto the first plane;
   projecting the icon onto a second plane on which a second reference point lies;
   forming a second image according to the projection onto the second plane;
   whereby the first image and second images form a first stereoscopic pair of images; and
   wherein the first stereoscopic pair is displayed in stereoscopic format.

8. A method according to claim 7 further comprising:
   projecting the icon onto a third plane on which a third reference point lies;
   forming a third image according to the projection onto the third plane;
   projecting the icon onto a fourth plane on which a fourth reference point lies;
   forming a fourth image according to the projection onto the fourth plane;
   whereby the third image and fourth images form a second stereoscopic pair of images, thereby rotating the display of the at least one object; and
   wherein the second stereoscopic pair is displayed in stereoscopic format.

* * * * *